(12) United States Patent
Zou et al.

(10) Patent No.: US 12,472,676 B2
(45) Date of Patent: Nov. 18, 2025

(54) HEAT TREATMENT DEVICE FOR PET BOTTLE PREFORM WITH INTEGRAL HANDLE

(71) Applicant: GUANGZHOU TECH-LONG PACKAGING MACHINERY CO., LTD, Guangdong (CN)

(72) Inventors: Daqun Zou, Guangdong (CN); Guanyuan Zeng, Guangdong (CN); Jingfeng Liu, Guangdong (CN)

(73) Assignee: GUANGZHOU TECH-LONG PACKAGING MACHINERY CO., LTD, Guangdong (CN)

( * ) Notice: Subject to any disclaimer, the term of this patent is extended or adjusted under 35 U.S.C. 154(b) by 406 days.

(21) Appl. No.: 18/020,540

(22) PCT Filed: Sep. 29, 2020

(86) PCT No.: PCT/CN2020/118766
§ 371 (c)(1),
(2) Date: Feb. 9, 2023

(87) PCT Pub. No.: WO2022/056958
PCT Pub. Date: Mar. 24, 2022

(65) Prior Publication Data
US 2023/0264409 A1  Aug. 24, 2023

(30) Foreign Application Priority Data

Sep. 17, 2020  (CN) .......................... 202010981815.8
Sep. 17, 2020  (CN) .......................... 202022046462.0

(51) Int. Cl.
*B29C 49/64*   (2006.01)
*B29C 49/42*   (2006.01)
(Continued)

(52) U.S. Cl.
CPC .... *B29C 49/6436* (2013.01); *B29C 49/42414* (2022.05); *B29C 49/64* (2013.01);
(Continued)

(58) Field of Classification Search
CPC ............ B29C 49/6435; B29C 49/6445; B29K 2067/003; F27B 9/00; F27D 9/00; F27D 2009/0075
See application file for complete search history.

(56) References Cited

U.S. PATENT DOCUMENTS 4,280,805 A    7/1981  Hafele
9,962,881 B2 * 5/2018  Brunson ............... B29C 49/482
(Continued)

FOREIGN PATENT DOCUMENTS

CN    101214725 A    7/2008
CN    201169052 Y    12/2008
(Continued)

OTHER PUBLICATIONS

Japanese Office Action dated Jan. 16, 2024, issued during the prosecution of Japanese Patent Application No. JP 2023-504054.
(Continued)

*Primary Examiner* — Gregory A Wilson
(74) *Attorney, Agent, or Firm* — Troutman Pepper Locke LLP; Scott D. Wofsy; Gabrielle L. Gelozin

(57) ABSTRACT

A heat treatment device for a PET bottle preform with an integral handle includes an air-cooling knife, a heating furnace, and a transport mechanism. The air-cooling knife is disposed on an outlet side of the heating furnace, the bottle preform is transported into the heating furnace through the transport mechanism, heated in the heating furnace, and transported to the air-cooling knife, and the air-cooling knife jets airflow to and cools a lower end of a handle of the bottle preform, appropriately reducing the temperature at junction
(Continued)

of the lower end of the handle and a bottle body so that a gentle transition between the temperature of the bottle body and the temperature of the handle is achieved, and the handle is not easily deformed after the bottle preform is blown, thereby effectively improving the quality of the bottle preform after blown.

9 Claims, 4 Drawing Sheets

(51) Int. Cl.
  *F27D 9/00*   (2006.01)
  *B29K 67/00*  (2006.01)
  *B29L 31/00*  (2006.01)
  *F27B 9/00*   (2006.01)

(52) U.S. Cl.
  CPC ...... *B29C 49/6418* (2013.01); *B29C 49/6435* (2022.05); *F27D 9/00* (2013.01); *B29K 2067/003* (2013.01); *B29L 2031/7158* (2013.01); *F27B 9/00* (2013.01); *F27D 2009/0075* (2013.01)

(56) References Cited

U.S. PATENT DOCUMENTS

| | | | |
|---|---|---|---|
| 11,840,007 B2 * | 12/2023 | Deng | B29C 49/42119 |
| 2005/0136149 A1 | 6/2005 | Krishnakumar et al. | |
| 2005/0163952 A1 | 7/2005 | Beale | |
| 2014/0034601 A1 * | 2/2014 | Thibodeau | B29C 49/12 |
| | | | 215/398 |
| 2017/0036390 A1 | 2/2017 | Thibodeau et al. | |
| 2020/0254676 A1 | 8/2020 | Mellen et al. | |
| 2022/0281153 A1 * | 9/2022 | Thibodeau | B29C 49/4205 |

FOREIGN PATENT DOCUMENTS

| | | | | |
|---|---|---|---|---|
| CN | 104476758 A | | 4/2015 | |
| CN | 110605841 A | | 12/2019 | |
| CN | 111283986 A | | 6/2020 | |
| CN | 111283987 A | * | 6/2020 | ......... B29C 49/6418 |
| CN | 211074671 U | | 7/2020 | |
| CN | 212266636 U | * | 1/2021 | ......... B29C 49/6418 |
| CN | 212603342 U | | 2/2021 | |
| CN | 117382147 A | * | 1/2024 | ............ B29C 49/06 |
| DE | 202018104724 U1 | | 8/2018 | |
| JP | H06-064027 A | | 3/1994 | |
| JP | H11-070569 A | | 3/1999 | |
| JP | H 11-188785 A | | 7/1999 | |
| JP | 2000062011 A | | 2/2000 | |
| JP | 3616484 B2 | * | 2/2005 | ........... B65D 23/106 |
| JP | 2006198863 A | | 8/2006 | |
| JP | 2011011479 A | | 1/2011 | |
| KR | 102260061 B1 | * | 6/2021 | |
| KR | 20220006884 A | * | 1/2022 | |

OTHER PUBLICATIONS

Chinese Notice of Mar. 13, 2025, and English translation, issued during the prosecution of CN 202010981815.8.
Extended European Search Report dated Oct. 30, 2024, issued during the prosecution of EP 20953816.4.
Chinese 1st Examination Report dated Oct. 29, 2024, issued during the prosecution of CN 202010981815.8.
International Search Report issued in PCT/CN2020/118766, dated Jun. 10, 2021.

* cited by examiner

HEAT TREATMENT DEVICE FOR PET BOTTLE PREFORM WITH INTEGRAL HANDLE

CROSS REFERENCE TO RELATED APPLICATIONS

This is a national stage application filed under 35 U.S.C. 371 based on International Patent Application No. PCT/CN2020/118766, filed Sep. 29, 2020, which claims priority to Chinese Patent Application No. 202010981815.8 filed Sep. 17, 2020 and Chinese Patent Application No. 202022046462.0 filed Sep. 17, 2020, the disclosures of which are incorporated herein by reference in their entireties.

TECHNICAL FIELD

The present application relates to the technical field of bottle blowing machines, for example, a heat treatment device for a PET bottle preform with an integral handle.

BACKGROUND

Currently, plastic feeding bottles and beverage bottles with handles on the market are mainly divided into two types: high-density polyethylene (HDPE) bottles with handles and PET polyethylene terephthalate (PET) bottles with post-installed handles. The HDPE bottles with post-installed handles have some defects such as incomplete sealing, an easily-broken bottle body, and an uncontrollable bottle capacity. Although the PET bottles have the advantages of better sealability, a firm bottle body, a high oxygen barrier property, and transparency and easy to be observed compared with the HDPE bottles, currently, the PET bottles need to be provided with post-installed handles, and the post-installed handles in the PET milk bottles needs special devices for production and installation and is easy to fall off after installation. For the preceding reasons, relevant enterprises in the industry hope to replace the PET bottles with post-installed handles on the current market with the PET bottles with integral handles.

To ensure that the position of the handle is unchanged and the shape of the handle is intact, the blank material at the handle of the bottle preform can only be stretched in a transverse direction and cannot be stretched in a longitudinal direction. Therefore, technical treatment needs to be performed on the handle during a bottle preform heating process, so as to prevent the handle from becoming soft and deformed when the temperature at the handle is too high during a bottle blowing process, thereby preventing the bottle blowing failure. Through a large number of bottle blowing tests, it is found that if a wall thickness of each part of the bottle is comprehensively ensured to satisfy physical performance requirements of the bottle, the handle at low temperature and the bottle body at high temperature after the bottle preform is heated should have a relatively gentle temperature transition region, that is, the temperature at the joint between the handle and the bottle body and the temperature at a lower end of the handle should be appropriately increased, however the adverse effect is that the lower end of the handle is elongated downwards and deformed after the bottle preform is blown. However, in a heating furnace in the related art, an infrared lamp tube is used to heat the bottle preform and the following problem cannot be solved: the temperature transition region should exist on the bottle preform, and meanwhile the lower end of the handle should not be heated to the relatively high temperature and deformed.

SUMMARY

The present application provides a heat treatment device for a PET bottle preform with an integral handle. A lower end of the handle of the bottle preform is separately cooled by an air-cooling knife so that a gentle transition of the temperature at the junction of a bottle body of the bottle preform and the lower end of the handle is achieved, thereby effectively improving the quality of the bottle preform after blown.

An embodiment provides a heat treatment device for a PET bottle preform with an integral handle. The heat treatment device for a PET bottle preform with an integral handle includes an air-cooling knife, a heating furnace, and a transport mechanism, where the air-cooling knife is disposed on an outlet side of the heating furnace; the transport mechanism is configured to transport the bottle preform into the heating furnace, the heating furnace is configured to heat the bottle preform; the transport mechanism is configured to transport the heated bottle preform to the air-cooling knife, where the PET bottle preform includes a bottle body and a handle disposed on the bottle body; and the air-cooling knife is configured to jet airflow to and cool a lower end of the handle.

As an optional implementation of the present application, the air-cooling knife is disposed on a side of the bottle body and under the handle, the air-cooling knife is provided with a first air outlet and a second air outlet, a distance between the first air outlet and the bottle body is shorter than a distance between the second air outlet and the bottle body, an airflow jetted out from the second air outlet faces the handle and is vertically upward, and an airflow jetted out from the first air outlet faces the handle and is deflected to a side of the second air outlet.

As an optional implementation of the present application, the air-cooling knife includes a knife body, a first airflow-guiding member, and a second airflow-guiding member, where the first airflow-guiding member and the second airflow-guiding member are both detachably connected to the knife body, the knife body is internally provided with a cavity, the first airflow-guiding member and the knife body are assembled to form the first air outlet, the second airflow-guiding member and the knife body are assembled to form the second air outlet, and the first air outlet and the second air outlet both is in communication with the cavity.

As an optional implementation of the present application, the first airflow-guiding member includes an extending portion, where the extending portion is disposed on a side of the first air outlet facing the bottle body, a top end of the extending portion is disposed above the first air outlet, an airflow-guiding surface is formed on a side of the extending portion facing away from the bottle body, and the airflow jetted out from the first air outlet impacts on the airflow-guiding surface and is deflected by the airflow-guiding surface.

As an optional implementation of the present application, an included angle between the airflow-guiding surface and a vertical direction is 0 to 15 degrees.

As an optional implementation of the present application, the PET bottle preform is configured to move linearly without rotating when passing through the air-cooling knife, and the first air outlet and the second air outlet are each arranged in a linear shape.

Alternatively, the PET bottle preform is configured to move in a curve when passing through the air-cooling knife, and the first air outlet and the second air outlet are each arranged in a curve shape.

As an optional implementation of the present application, the air-cooling knife is configured to cool at least two bottle preforms simultaneously.

As an optional implementation of the present application, the heat treatment device for a PET bottle preform with an integral handle further includes a knife holder, where the air-cooling knife is connected to the knife holder, the knife holder is internally provided with a pressure equalizing chamber, and the pressure equalizing chamber is in communication with the cavity.

As an optional implementation of the present application, a temperature of the airflow jetted out from the air-cooling knife is 3 to 10 degrees centigrade.

As an optional implementation of the present application, the heating furnace includes a first heating region and a second heating region, where the first heating region is configured to heat a lower part of the bottle body, the second heating region is configured to heat an upper part of the bottle body and the handle, and heating temperature of the second heating region is lower than heating temperature of the first heating region.

In the heat treatment device for a PET bottle preform with an integral handle, the air-cooling knife is disposed on the outlet side of the heating furnace, the air-cooling knife cools the lower end of the handle of the bottle preform by blowing air, and the airflow appropriately reduces the temperature at the junction of the lower end of the handle and the bottle body of the bottle preform so that a gentle transition between the temperature of the bottle body and the temperature of the handle is achieved, and the handle is not easily deformed after the bottle preform is blown, thereby effectively improving the quality of the bottle preform after blown.

REFERENCE LIST

| | | | | | |
|---|---|---|---|---|---|
| 1 | air-cooling knife | 10 | knife body | 130 | cavity |
| 11 | first airflow-guiding member | 110 | first air outlet | | |
| 111 | extending portion | 1111 | airflow-guiding surface | | |
| 12 | second airflow-guiding member | 120 | second air outlet | | |
| 2 | heating furnace | 20 | infrared lamp tube | | |
| 210 | first heating region | 220 | second heating region | | |
| 230 | air inlet mechanism | 240 | air outlet mechanism | | |
| 3 | transport mechanism | 4 | knife holder | | |
| 40 | pressure equalizing chamber | 100 | bottle preform | | |
| 101 | bottle body | 102 | handle | | |

DETAILED DESCRIPTION

Technical solutions of the present application are further described hereinafter through embodiments in conjunction with the drawings.

In the present application, unless otherwise expressly specified and limited, when a first feature is described as "above" or "below" a second feature, the first feature and the second feature may be in direct contact or be in contact via another feature between the two features instead of being in direct contact. Moreover, when the first feature is described as "on" the second feature, the first feature is right on or obliquely on the second feature, or the first feature is merely at a higher level than the second feature. When the first feature is described as "below" the second feature, the first feature is right below or obliquely below the second feature, or the first feature is merely at a lower level than the second feature.

Moreover, terms like "first" and "second" are merely for description and are not to be construed as indicating or implying relative importance or implicitly indicating the number of technical features as indicated. Thus, a feature defined as a "first" feature or a "second" feature may explicitly or implicitly include one or more of such features.

Figure 1:
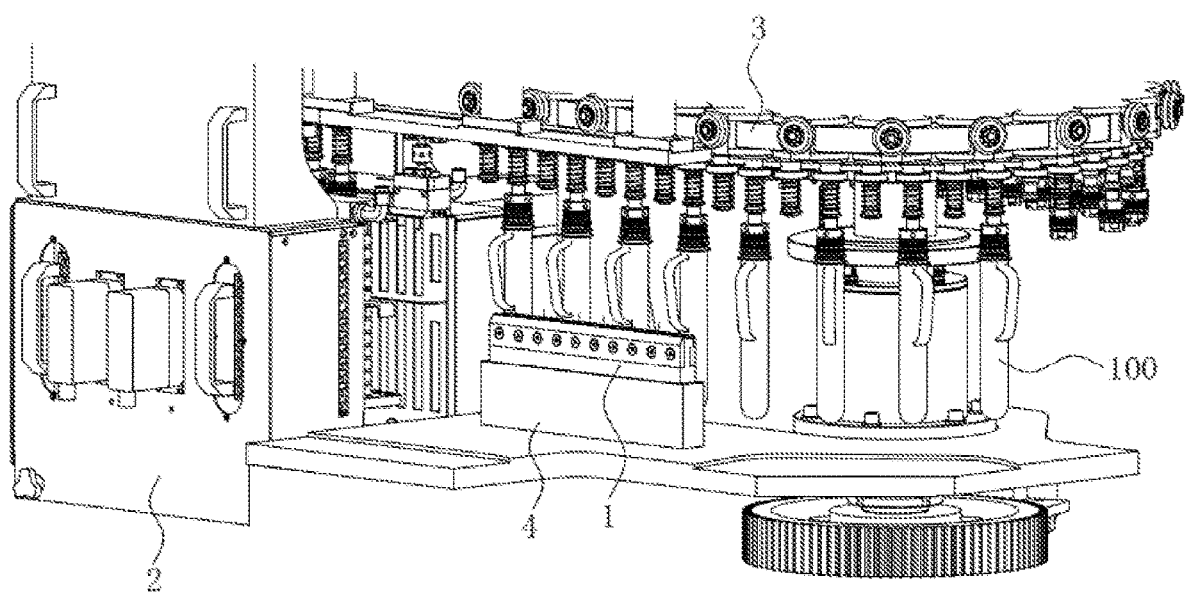
FIG. 1 is a perspective view of a heat treatment device for a PET bottle preform with an integral handle according to an embodiment of the present application.
Figure 2:
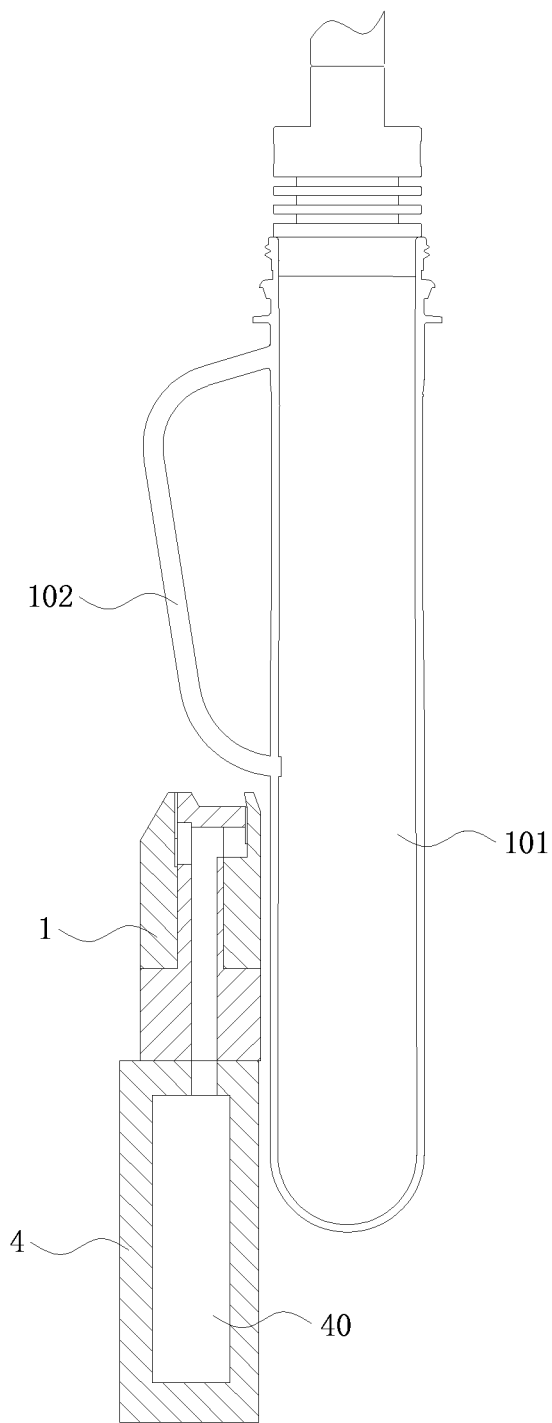
FIG. 2 is a schematic view illustrating a positional relationship among an air-cooling knife, a knife holder, and a bottle preform according to an embodiment of the present application.

As shown in FIGS. 1 and 2, a heat treatment device for a PET bottle preform with an integral handle in this embodiment includes an air-cooling knife 1, a heating furnace 2, and a transport mechanism 3. The air-cooling knife 1 is disposed on an outlet side of the heating furnace 2. The bottle preform 100 is transported to the heating furnace 2 through the transport mechanism 3, heated in the heating furnace 2, and transported to the air-cooling knife 1 through the transport mechanism 3. The bottle preform 100 includes a bottle body 101 and a handle 102 connected to the bottle body 101. The air-cooling knife 1 jets airflow to and cools a lower end of the handle 102.

In the heat treatment device for a PET bottle preform with an integral handle of this embodiment, the air-cooling knife 1 is disposed on the outlet side of the heating furnace 2, the air-cooling knife 1 jets airflow to and cools the lower end of the handle 102 of the bottle preform 100, and airflow jetted out from the air-cooling knife 1 appropriately reduces the temperature at the junction of the lower end of the handle 102 and the bottle body 101 so that a gentle transition between the temperature of the bottle body 101 and the temperature of the handle 102 is achieved, and the handle 102 is not easily deformed after the bottle preform 100 is blown, thereby effectively improving the quality of the bottle preform 100 after blown.

Figure 3:
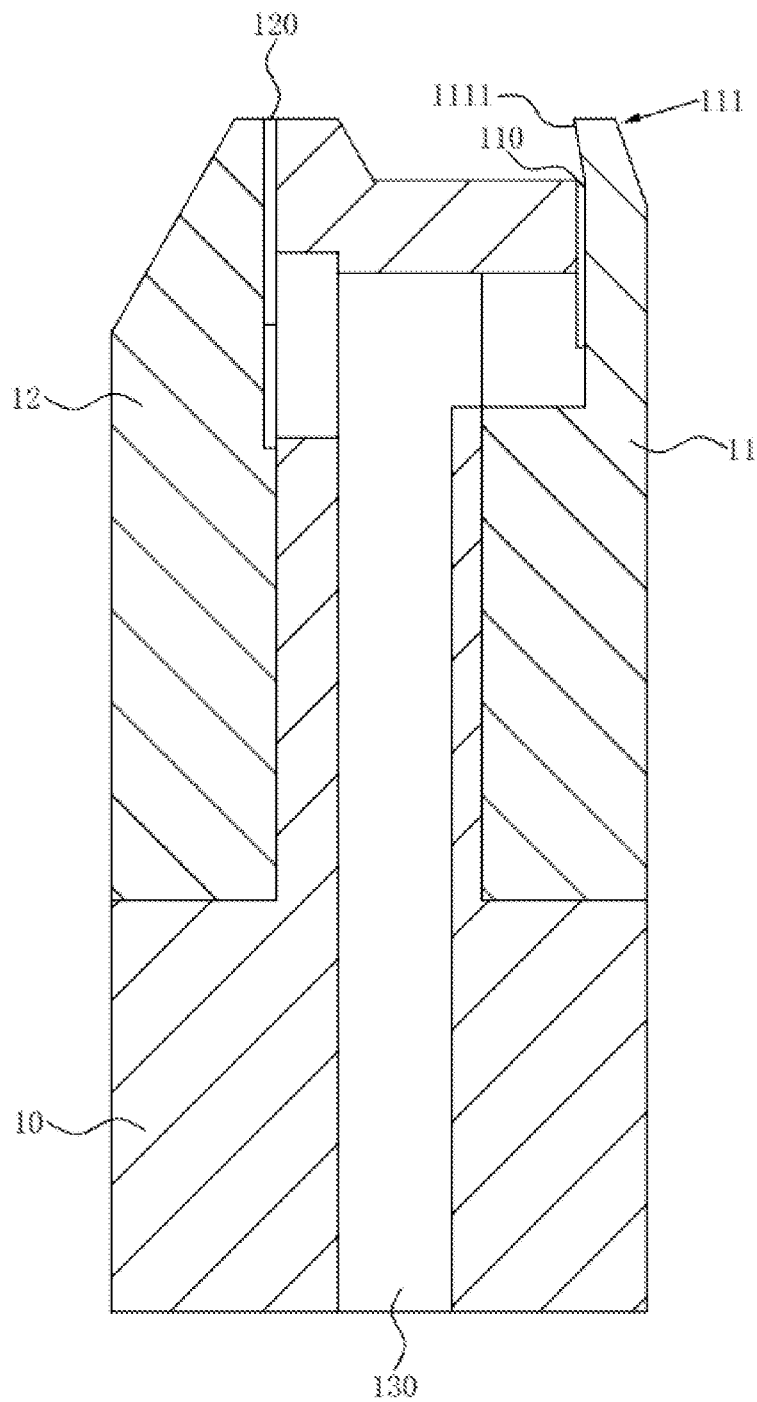
FIG. 3 is a sectional view of an air-cooling knife according to an embodiment of the present application.

As shown in FIGS. 2 and 3, optionally, the air-cooling knife 1 is disposed on a side of the bottle body 101 of the bottle preform 100 and below the handle 102, a first air outlet 110 and a second air outlet 120 are disposed on the air-cooling knife 1, a distance between the first air outlet 110 and the bottle body 101 is shorter than a distance between the second air outlet 120 and the bottle body 101, an airflow jetted out from the second air outlet 120 faces the handle 102 and is vertically upward, and an airflow jetted out from the first air outlet 110 faces the handle 102 and is deflected to a side of the second air outlet 120. Two air outlets are provided so that a cooling range of the air-cooling knife 1 is relatively large. Since the first air outlet 110 is closer to the bottle body 101, the airflow jetted out from the first air outlet 110 needs to be deflected to a certain extent in a direction away from the bottle body 101, that is, the airflow jetted out from the first air outlet 110 needs to be deflected to the side of the second air outlet 120, in order to prevent the airflow jetted out from the first air outlet 110 from cooling a lower part of the bottle body 101 which should be kept at a higher temperature.

In an example, the air-cooling knife 1 includes an knife body 10, a first airflow-guiding member 11, and a second airflow-guiding member 12, where the first airflow-guiding member 11 and the second airflow-guiding member 12 are both detachably connected to the knife body 10, the knife body 10 is internally provided with a cavity 130, the first airflow-guiding member 11 and the knife body 10 are assembled to form the first air outlet 110, the second airflow-guiding member 12 and the knife body 10 are assembled to form the second air outlet 120, and the first air outlet 110 and the second air outlet 120 both are in communication with the cavity 130. Dimensions of handles 102 of bottle preforms 100 with different dimensions or shapes are generally different. The first airflow-guiding member 11 and the second airflow-guiding member 12 can be replaced to achieve that shapes of the first air outlet 110 and the second air outlet 120 are changed to match the shape of a specific bottle preform 100, thereby ensuring a good cooling effect.

As shown in FIG. 3, in an embodiment, the first airflow-guiding member 11 includes an extending portion 111, where the extending portion 111 is disposed on a side of the first air outlet 110 facing the bottle body 101, a top end of the extending portion 111 is disposed above the first air outlet 110, an airflow-guiding surface 1111 is formed on a side of the extending portion 111 facing away from the bottle body 101, and the airflow jetted out from the first air outlet 110 impacts on the airflow-guiding surface and is deflected by the airflow-guiding surface 1111. The airflow-guiding surface 1111 is a plane having a certain included angle with a vertical direction so that an airflow direction can be restricted and the airflow can be prevented from directly impacting on the bottle body 101 and lowering the temperature of the bottle body 101.

In an example, the included angle between the airflow-guiding surface 1111 and the vertical direction is 0 to 15 degrees. The inclination angle of the airflow-guiding surface 1111 cannot be too large, otherwise the airflow jetted out from the first air outlet 110 cannot directly blow onto the handle 102, thereby affecting the cooling effect of the air-cooling knife 1 on the handle 102.

Optionally, the first air outlet 110 and the second air outlet 120 are each arranged in a linear shape, and the bottle preform 100 moves linearly without rotating when passing through the air-cooling knife 1. The first air outlet 110 and the second air outlet 120 are both in a long and narrow linear shape, so that the machining difficulty of the air-cooling knife 1 is relatively low, and the width consistency of the first air outlet 110 and the second air outlet 120 can be better ensured, which achieves that the airflow velocity and flow consistency of the airflow jetted out from each of the first air outlet 110 and the second air outlet 120 are better, thereby facilitating more accurate control of the cooling performance of the air-cooling knife 1. In order that the shapes of the bottle preform 100 match the shapes of the first air outlet 110 and the second air outlet 120, the transport mechanism 3 needs to keep the bottle preform 100 moving linearly without rotating when passing through the air-cooling knife 1 so that the cooling airflow always blows towards the handle 102.

In other embodiments, to save the transport space, the bottle preform 100 moves in a curve when passing through the air-cooling knife 1, and a trajectory of the bottle preform 100 includes an arc of a circle so that the shapes of the first air outlet 110 and the second air outlet 120 are each arranged in a curve shape, and the cooling airflow always blows towards the handle 102.

In an example, the air-cooling knife 1 cools at least two bottle preforms 100 simultaneously. If a dimension of the air-cooling knife 1 is relatively small, the time for a single bottle preform 100 to be cooled is relatively short. To ensure the cooling effect, a transport speed of the bottle preform 100 needs to be relatively low, however it is not conducive to improving the production efficiency. The dimension of the air-cooling knife 1 is appropriately increased so that a single bottle preform 100 can be cooled by the cooling airflow for a relatively long time even if the transport speed of the bottle preform 100 is relatively high, and it is conducive to improving the production efficiency.

As shown in FIG. 2, in an embodiment, the heat treatment device for a PET bottle preform with an integral handle further includes a knife holder 4, where the air-cooling knife 1 is connected to the knife holder 4, a pressure equalizing chamber 40 is disposed inside the knife holder 4, and the pressure equalizing chamber 40 is in communication with the cavity 130. The cooling airflow enters the pressure equalizing chamber 40 of the knife holder 4, flows into the cavity 130, and is jetted out from the first air outlet 110 and the second air outlet 120. Therefore, the pressure stability of the cooling airflow jetted out from the air-cooling knife 1 can be ensured, and the consistency of the cooling effect of the air-cooling knife 1 can be improved so that the cooling effect does not fluctuate greatly over time.

Optionally, temperature of an airflow jetted out from the air-cooling knife 1 is 3 to 10 degrees centigrade. This temperature range not only provides a good cooling effect, but also does not adversely affect the bottle preform 100 due to the excessively low temperature.

Figure 4:
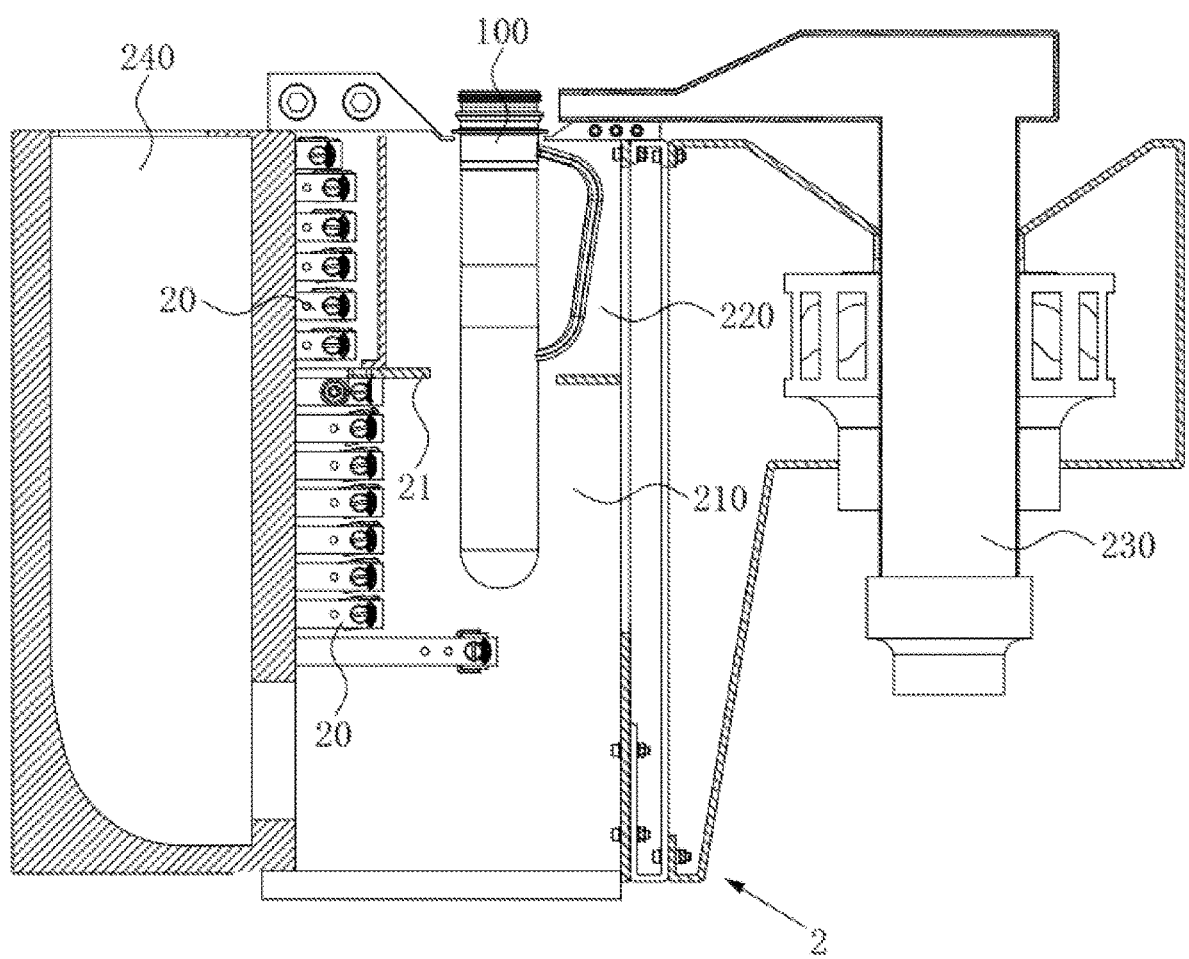
FIG. 4 is a structural view of a heating furnace according to an embodiment of the present application.

As shown in FIG. 4, optionally, the heating furnace 2 includes a first heating region 210 and a second heating region 220, where the first heating region 210 heats a lower part of the bottle body 101 of the bottle preform 100, the second heating region 220 heats an upper part of the bottle body 101 of the bottle preform 100 and the handle 102, and heating temperature of the second heating region 220 is lower than heating temperature of the first heating region 210. The heating furnace 2 heats the bottle preform 100 through several infrared lamp tubes 20. The heating temperature of the first heating region 210 and the heating temperature of the second heating region 220 are adjusted through an air inlet mechanism 230 and an air outlet mechanism 240 so that after temperature of each part of the bottle preform 100 reaches target temperature, the bottle preform 100 is transported to the air-cooling knife 1 for local cooling.

The air, enters from the air inlet mechanism 230, flows into the first heating region 210, passes through the second heating region 220 and is discharged from the air outlet mechanism 240 so that the hot air from the second heating region 220 cannot flow into the first heating region 210, and the first heating region 210 is not heated by the airflow in the second heating region 220.

As a preferable embodiment of the present application, in the description of the specification, the description of reference terms such as "preferably" means that specific features, structures, materials or characteristics described in conjunction with the embodiment or the example are included in at least one embodiment or example of the present application. In the specification, the illustrative description of the preceding terms does not necessarily refer to the same embodiment or example. Moreover, the described specific features, structures, materials or characteristics may be combined in an appropriate manner in any one or more embodiments or examples.

What is claimed is:

1. A heat treatment device for a polyethylene terephthalate (PET) bottle preform with an integral handle, comprising an air-cooling knife, a heating furnace, and a transport mechanism, wherein the air-cooling knife is disposed on an outlet side of the heating furnace,
   wherein the transport mechanism is configured to transport the bottle preform into the heating furnace; the heating furnace is configured to heat the bottle preform; the transport mechanism is configured to transport the heated bottle preform to the air-cooling knife; the bottle preform comprises a bottle body and a handle disposed on the bottle body, and the air-cooling knife is configured to jet airflow to and cool a lower end of the handle, and
   wherein the air-cooling knife is disposed on a side of the bottle body of the bottle preform and below the handle, a first air outlet and a second air outlet are disposed on the air-cooling knife, a distance between the first air outlet and the bottle body is shorter than a distance between the second air outlet and the bottle body, an airflow jetted out from the second air outlet faces the handle and is vertically upward, and an airflow jetted out from the first air outlet faces the handle and is deflected to a side of the second air outlet.

2. The heat treatment device for the PET bottle preform with an integral handle of claim 1, wherein the air-cooling knife comprises an knife body, a first airflow-guiding member, and a second airflow-guiding member, wherein the first airflow-guiding member and the second airflow-guiding member are both detachably connected to the knife body, the knife body is internally provided with a cavity, the first airflow-guiding member and the knife body are assembled to form the first air outlet, the second airflow-guiding member and the knife body are assembled to form the second air outlet, and the first air outlet and the second air outlet both are in communication with the cavity.

3. The heat treatment device for the PET bottle preform with an integral handle of claim 2, wherein the first airflow-guiding member comprises an extending portion, wherein the extending portion is disposed on a side of the first air outlet facing the bottle body, a top end of the extending portion is disposed above the first air outlet, an airflow-guiding surface is formed on a side of the extending portion facing away from the bottle body, and the airflow jetted out from the first air outlet impacts on the airflow-guiding surface and is deflected by the airflow-guiding surface.

4. The heat treatment device for the PET bottle preform with an integral handle of claim 3, wherein an included angle between the airflow-guiding surface and a vertical direction is 0 to 15 degrees.

5. The heat treatment device for the PET bottle preform with an integral handle of claim 2, further comprising a knife holder, wherein the air-cooling knife is connected to the knife holder, the knife holder is internally provided with a pressure equalizing chamber, and the pressure equalizing chamber is in communication with the cavity.

6. The heat treatment device for the PET bottle preform with an integral handle of claim 1, wherein the bottle preform is configured to move linearly without rotating when passing through the air-cooling knife, and the first air outlet and the second air outlet are each arranged in a linear shape; or
   the bottle preform is configured to move in a curve when passing through the air-cooling knife, and the first air outlet and the second air outlet are each arranged in a curve shape.

7. The heat treatment device for the PET bottle preform with an integral handle of claim 6, wherein the air-cooling knife is configured to cool at least two bottle preforms simultaneously.

8. The heat treatment device for the PET bottle preform with an integral handle of claim 1, wherein temperature of the airflow jetted out from the air-cooling knife is 3 to 10 degrees centigrade.

9. A heat treatment device for a polyethylene terephthalate (PET) bottle preform with an integral handle, comprising an air-cooling knife, a heating furnace, and a transport mechanism, wherein the air-cooling knife is disposed on an outlet side of the heating furnace,
   wherein the transport mechanism is configured to transport the bottle preform into the heating furnace; the heating furnace is configured to heat the bottle preform; the transport mechanism is configured to transport the heated bottle preform to the air-cooling knife; the bottle preform comprises a bottle body and a handle disposed on the bottle body, and the air-cooling knife is configured to jet airflow to and cool a lower end of the handle, and
   wherein the heating furnace comprises a first heating region and a second heating region, the first heating region is configured to heat a lower part of the bottle body, the second heating region is configured to heat an upper part of the bottle body and the handle, and heating temperature of the second heating region is lower than heating temperature of the first heating region.

\* \* \* \* \*